(12) United States Patent
Moriuchi et al.

(10) Patent No.: US 9,113,120 B2
(45) Date of Patent: Aug. 18, 2015

(54) APPARATUS AND A METHOD FOR PROCESSING A MOVING IMAGE, AND A NON-TRANSITORY COMPUTER READABLE MEDIUM THEREOF

(71) Applicants: Yusuke Moriuchi, Kanagawa-ken (JP); Toshimitsu Kaneko, Kanagawa-ken (JP); Kanako Saito, Kanagawa-ken (JP)

(72) Inventors: Yusuke Moriuchi, Kanagawa-ken (JP); Toshimitsu Kaneko, Kanagawa-ken (JP); Kanako Saito, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 13/722,229

(22) Filed: Dec. 20, 2012

(65) Prior Publication Data

US 2013/0182143 A1 Jul. 18, 2013

(30) Foreign Application Priority Data

Jan. 18, 2012 (JP) ................................. 2012-008415

(51) Int. Cl.
 *H04N 9/73* (2006.01)
 *H04N 5/14* (2006.01)
 *G06K 9/00* (2006.01)
(52) U.S. Cl.
 CPC ............ *H04N 9/735* (2013.01); *G06K 9/00234* (2013.01); *H04N 5/147* (2013.01)
(58) Field of Classification Search
 CPC ....................................................... H04N 9/735
 USPC ............................................ 348/223.1, 225.1
 See application file for complete search history.

(56) References Cited

U.S. PATENT DOCUMENTS

| 6,545,710 | B1  | 4/2003  | Kubo et al.            |
|-----------|-----|---------|------------------------|
| 2007/0273931 | A1* | 11/2007 | Shingai ........... 358/3.27 |
| 2010/0033595 | A1* | 2/2010  | Ajito ............. 348/223.1 |
| 2011/0267491 | A1  | 11/2011 | Yokomitsu et al.       |

FOREIGN PATENT DOCUMENTS

| JP | 09-55949    | 2/1997  |
| JP | 2006-259974 | 9/2006  |
| JP | 2006-268153 | 10/2006 |
| WO | 2007/080834 | 7/2007  |

OTHER PUBLICATIONS

Office Action mailed Feb. 20, 2015 in counterpart Japanese Patent Application No. 2012-008415 and English-language translation thereof.

* cited by examiner

*Primary Examiner* — Twyler Haskins
*Assistant Examiner* — Quang Le
(74) *Attorney, Agent, or Firm* — Nixon & Vanderhye, P.C.

(57) ABSTRACT

According to one embodiment, an image processing apparatus includes an acquisition unit, a clustering unit, a detection unit, and a correction unit. The acquisition unit is configured to acquire a moving image including a plurality of frames. The clustering unit is configured to cluster frames having a similar scene to the same group in the moving image. The detection unit is configured to detect at least one object region from each frame clustered to the same group, and to calculate a color distribution of the object region of the each frame. The correction unit is configured to select a typical color distribution of the object region from the color distribution of the each frame, and to correct a color of the each frame clustered to the same group, based on the typical color distribution.

16 Claims, 9 Drawing Sheets

APPARATUS AND A METHOD FOR PROCESSING A MOVING IMAGE, AND A NON-TRANSITORY COMPUTER READABLE MEDIUM THEREOF

CROSS-REFERENCE TO RELATED APPLICATION

This application is based upon and claims the benefit of priority from Japanese Patent Application No. 2012-008415, filed on Jan. 18, 2012; the entire contents of which are incorporated herein by reference.

FIELD

Embodiments described herein relate generally to an apparatus and a method for processing a moving image, and a non-transitory computer readable medium thereof.

BACKGROUND

As to a moving image photographed by a video camera, an image processing method for correcting a color of each frame by adjusting a white balance thereof is well known. In this method, the white balance of each frame in the moving image is adjusted based on a screen component of each frame. As a result, variation of color of an object (for example, a person region) is often conspicuous.

Accordingly, in conventional technique of image processing, in order to suppress variation of color of the object, the same white balance is used for frames in a predetermined period. However, among a plurality of frames having a similar scene, when at least one frame is photographed after a predetermined time has passed from a timing when other frames were first photographed, a new white balance is used for the at least one frame. As a result, variation of color of the object is also conspicuous.

DETAILED DESCRIPTION

According to one embodiment, an image processing apparatus includes an acquisition unit, a clustering unit, a detection unit, and a correction unit. The acquisition unit is configured to acquire a moving image including a plurality of frames. The clustering unit is configured to cluster frames having a similar scene to the same group in the moving image. The detection unit is configured to detect at least one object region from each frame clustered to the same group, and to calculate a color distribution of the object region of the each frame. The correction unit is configured to select a typical color distribution of the object region from the color distribution of the each frame, and to correct a color of the each frame clustered to the same group, based on the typical color distribution.

Various embodiments will be described hereinafter with reference to the accompanying drawings.

(The First Embodiment)

An image processing apparatus 1 of the first embodiment is suitable for an image editing software able to edit a moving image. For example, the image editing software can be used for a personal computer or a digital camera.

The image processing apparatus 1 corrects a color of each frame in the moving image. Concretely, in the moving image, frames having a similar scene are clustered to the same group, and a color of each frame thereof is corrected so that a color distribution of an object region (For example, a person's face or skin) included in the each frame of the same group is unified.

As a result, color correction can be performed without conspicuousness of color-variation of the object region in the moving image. Moreover, in the first embodiment, a person's face is explained as one example of the object region.

Figure 1:
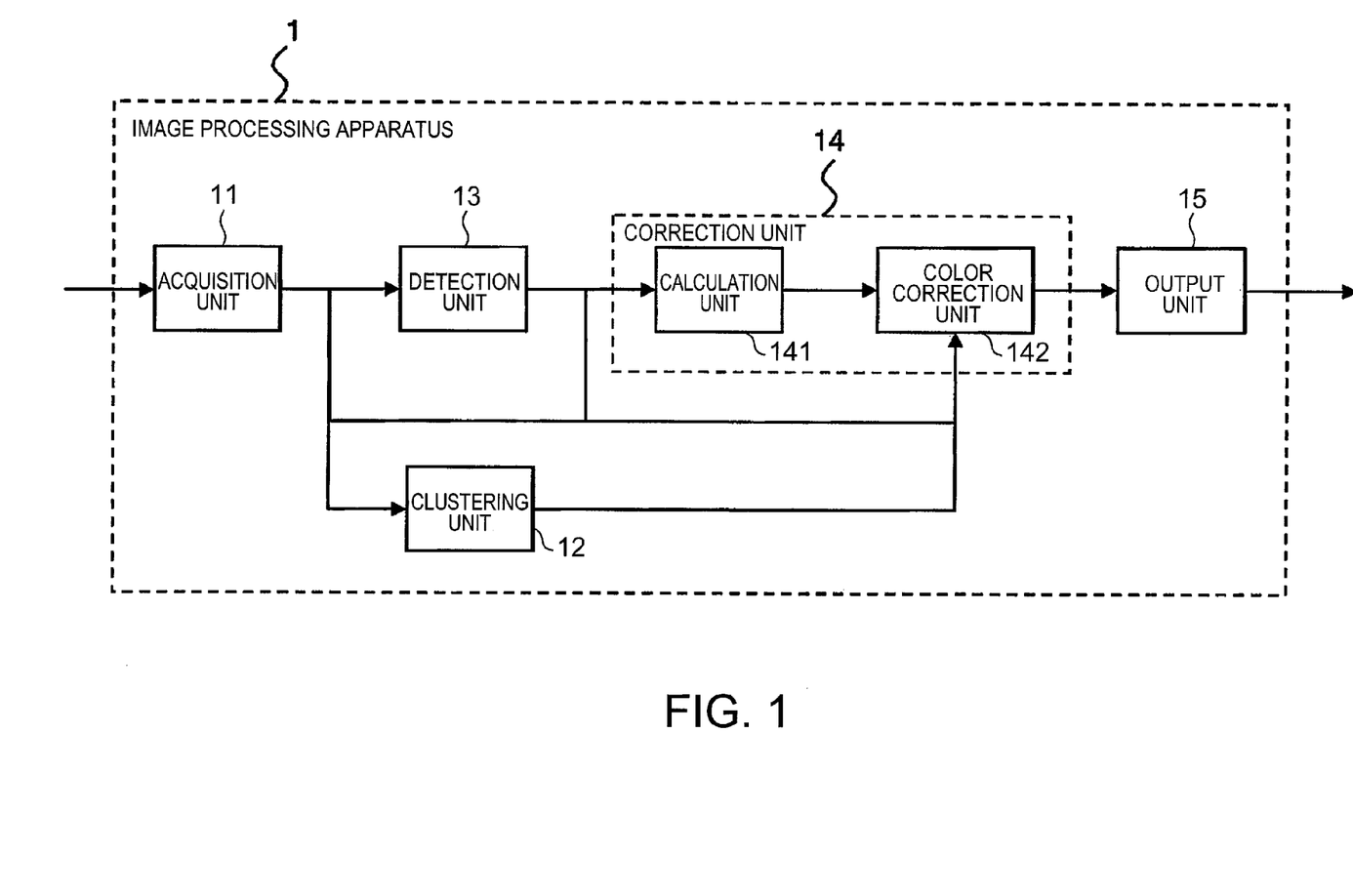
FIG. 1 is a block diagram of an image processing apparatus 1 according to the first embodiment.

FIG. 1 is a block diagram of the image processing apparatus 1. The image processing apparatus 1 includes an acquisition unit 11, a clustering unit 12, a detection unit 13, a correction unit 14, and an output unit 15. The correction unit 14 includes a calculation unit 141 and a color correction unit 142.

The acquisition unit 11 acquires a moving image comprising a plurality of frames.

In the moving image, the clustering unit 12 clusters frames having a similar scene to the same group. Even if frames having a similar scene are not continued but separated in time series, the clustering unit clusters these frames to the same group. Detail processing is explained afterwards.

The detection unit 13 detects at least one (same) person's face from each frame clustered to the same group, and calculates a color distribution (first color distribution) of this person's face of each frame.

The calculation unit 141 calculates a degree (first degree) of approximation between the first color distribution (of each frame) and a standard color distribution (first standard color distribution) of a person's face previously set.

Based on the first color distribution of a frame having the highest first degree and the first standard color distribution, the color correction unit 142 corrects a color of each frame so that color distribution of the object in each frame is unified.

The output unit 15 outputs the dynamic image comprising each frame of which color is corrected, for example, to a display device or a storage device.

The acquisition unit 11, the clustering unit 12, the detection unit 13, the correction unit 14 and the output unit 15, may be realized by a Central Processing Unit (CPU) and a memory used thereby.

Thus far, component of the image processing apparatus 1 is already explained.

Figure 2:
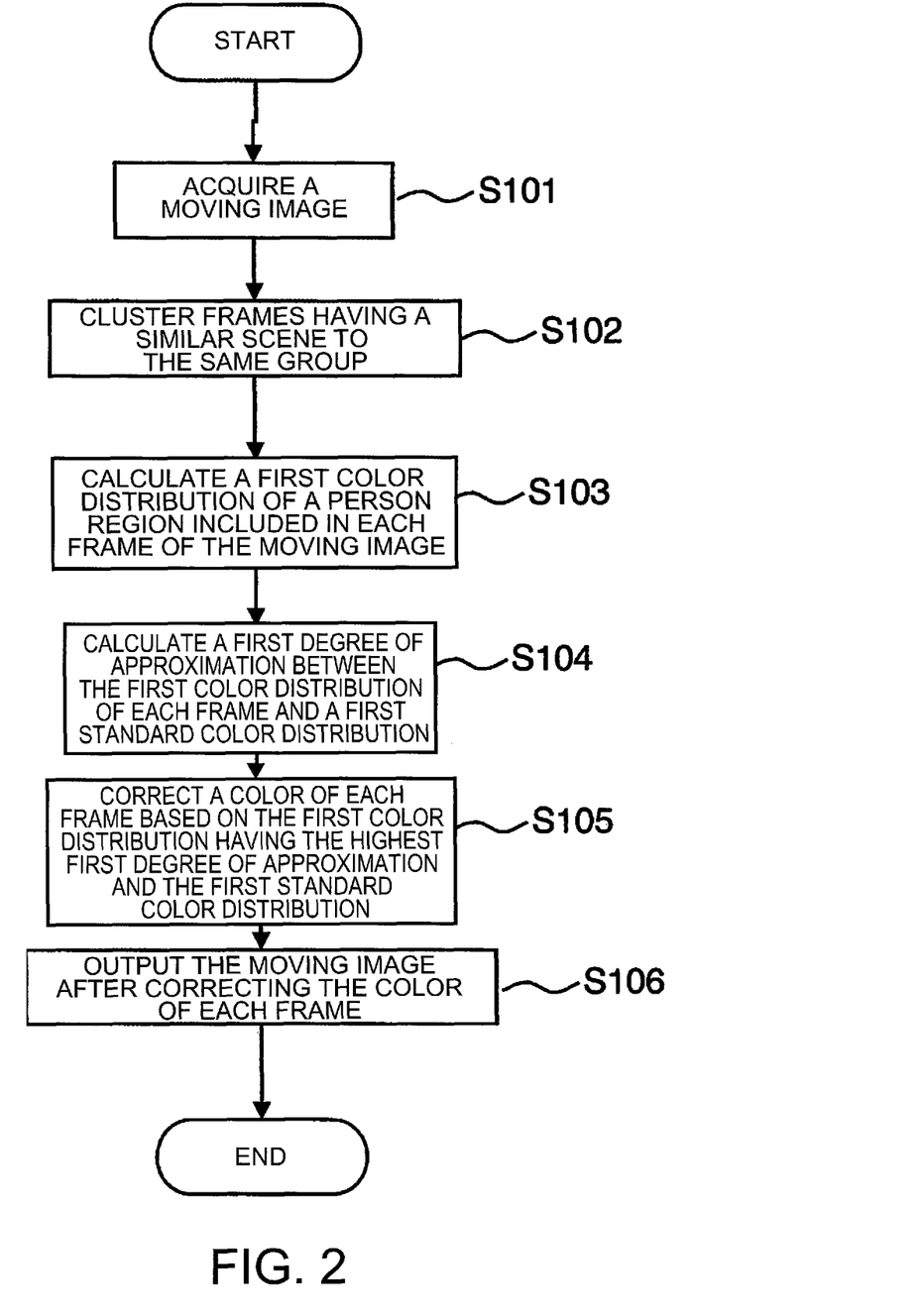
FIG. 2 is a flow chart of processing of the image processing apparatus 1.

FIG. 2 is a flow chart of processing of the image processing apparatus 1.

The acquisition unit 11 acquires a moving image (S101). For example, the moving image may be a video photographed by a video camera, or a video recorded into a hard disk recorder.

The clustering unit 12 clusters frames (in the moving image) having a similar scene to the same group (S102). For example, the clustering unit 12 calculates a distribution (SIFT feature) of pixel values of a local region in each frame, and clusters frames of which SIFT features are approximately equal to the same group.

The detection unit 13 detects at least one (same) person's face from frames clustered to each group, and calculates a first color distribution of the person's face of each frame (S103). At S103, the detection unit 13 may detect a person's face region (person region) by using conventional technique of face recognition, and may calculate a distribution of pixel values included in the person region as a first color distribution. A signal of the moving image acquired may be any format such as RGB signal or YUV signal.

The calculation unit 141 calculates a first degree of approximation between the first color distribution (of each frame) and a first standard color distribution (S104). The first standard color distribution is a color distribution of a person's skin observed under a predetermined light source, such as a sunlight, a fluorescent, an incandescent light, or a LED.

The calculation unit 141 may store data of the first standard color distribution. The data of the first standard color distribution represents a model image of the first standard color distribution or a signal value thereof.

Figure 3:
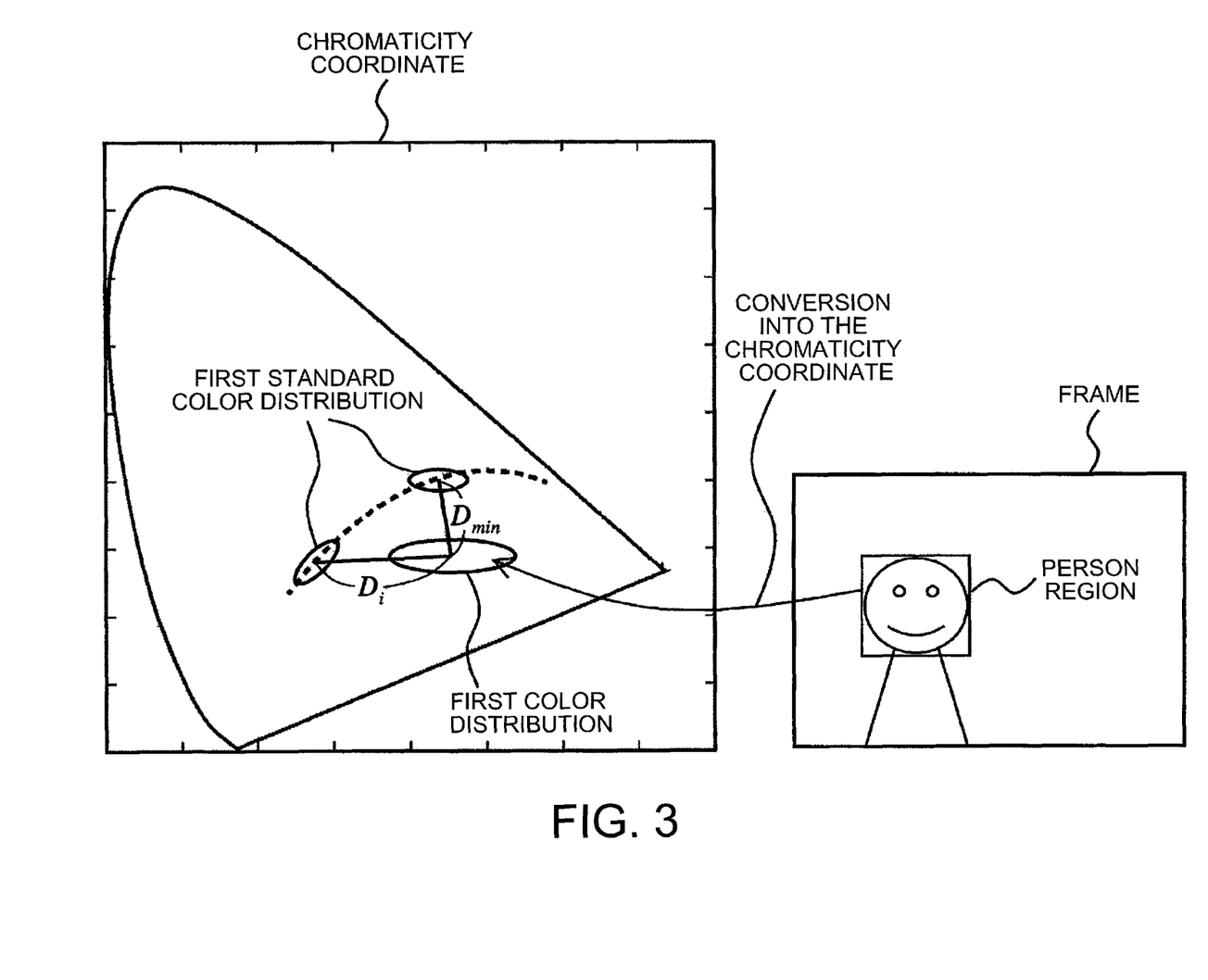
FIG. 3 is a schematic diagram to explain a first degree of approximation according to the first embodiment.

For example, the first degree of approximation may represent how far the first color distribution is separated from the first standard color distribution. FIG. 3 is a schematic diagram to explain the first degree of approximation. The right side of FIG. 3 shows a frame, and the left side of FIG. 3 shows a chromaticity coordinate. The calculation unit 141 converts the person region (detected from the frame) into the first color distribution on the chromaticity coordinate.

At S104, the calculation unit 141 calculates a distance $D_i$ (i=0,1,2,..., N) from a center of the first color distribution to a center of each first standard color distribution. Here, N is the number of light sources. As the light sources, if a sunlight, a fluorescent, an incandescent light, and a LED exist, N is equal to 4.

From a plurality of (In above-mentioned example, four) distances $D_i$, the calculation unit 141 selects the minimum value $D_{min}$ as a first degree of approximation between the first color distribution and the first standard color distribution. As to each frame, the calculation unit 141 calculates the first degree of approximation in the same way.

Moreover, except for above-mentioned method, the calculation unit 141 may define a locus of the first standard color distribution, and may calculate a distance between a center of the locus and the first color distribution as a first degree of approximation. For example, as the center of the locus, a distribution point of which distribution density is maximum may be used. Furthermore, a distribution point largely separated from the center of color distribution may not be used for calculating the first degree of approximation.

Based on the first color distribution (of a frame) having the highest first degree of approximation and the first standard color distribution, the color correction unit 142 corrects a color of each frame so that a color distribution of the object in each frame is unified (S105). Here, the first color distribution having the highest first degree of approximation is regarded as a typical color distribution of the object.

At S105, the color correction unit 105 selects one frame having the highest first degree of approximation from each group clustered by the clustering unit 12. For example, the color correction unit 142 corrects a color of each frame so that the color of each frame is unified with the first color distribution of the one frame having the highest first degree of approximation. Briefly, as for each group clustered, one frame having the highest degree of approximation is determined as a reference frame used for correcting frames clustered to the same group including the reference frame.

However, among frames within T seconds before and after the reference frame, if at least one frame clustered to another group (different from one group of the reference frame) is included, the reference frame may be deleted. In this case, another frame having the second highest first degree of approximation is selected from one group including the reference frame, and regarded as a new reference frame. Here, for example, T is larger than "0" and smaller than "10.0" seconds.

Furthermore, as to a frame from which the person region is not detected, a color of this frame is corrected by using an average of correction values of other frames (clustered to the same group as this frame) aligned before and after this frame.

The output unit 15 outputs the moving image in which the color of each frame is corrected, for example, to a display device or a storage device (S106).

Thus far, processing of the image processing apparatus is already explained.

(Modification)

The calculation unit 141 may not store data of the first standard color distribution, and may generate first standard color distribution data by using spectral distribution data $P(\lambda)$ of a light source and spectral reflectance data $R(\lambda)$ of the person region (For example, the person's skin).

Briefly, by integrating the spectral distribution data $P(\lambda)$ and the spectral reflectance data $R(\lambda)$ with a color-matching function $f(\lambda)$ represented as an equation (1), the calculation unit 141 generates a first standard color distribution.

$$f(\lambda) = [\bar{x}(\lambda) \bar{y}(\lambda) \bar{z}(\lambda)]^T \quad (1)$$

In the equation (1), T represents a transposition.

furthermore, if a spectral sensitivity $h(\lambda)$ of a camera is known as an equation (2), the spectral sensitivity $h(\lambda)$ may be used instead of the color-matching function $f(\lambda)$.

$$h(\lambda) = [\bar{r}(\lambda) \bar{g}(\lambda) \bar{b}(\lambda)]^T \quad (2)$$

Moreover, as the spectral distribution data $P(\lambda)$ of the light source, for example, a standard illuminant or a supplementary illuminant determined by JIS_Z__8720, or spectral distribution data of a typical fluorescent lamp determined by JIS_Z__8719 can be used. Furthermore, as the spectral reflectance data $R(\lambda)$ of the person's skin, standard skin data of a Japanese, a white and a Negro determined by SOCS (Standard Object Color Spectra database for color reproduction evaluation) can be used. In this case, a distribution of skin data is generated for each light source. In this modification, a first standard color distribution SSM (R, G, B) is calculated by an equation (3).

$$SSM'(X, Y, Z) = \begin{bmatrix} X \\ Y \\ Z \end{bmatrix} = k \int_{vis} T(\lambda) \cdot P(\lambda) \cdot \begin{bmatrix} \bar{x}(\lambda) \\ \bar{y}(\lambda) \\ \bar{z}(\lambda) \end{bmatrix} d\lambda \quad (3)$$

$$k = 100 \Big/ \int_{vis} P(\lambda) \cdot \bar{y}(\lambda) d\lambda$$

$$SSM(R, G, B) = \begin{bmatrix} R \\ G \\ B \end{bmatrix} = \begin{bmatrix} 2.3646 & -0.8966 & -0.4681 \\ -0.5152 & 1.4264 & 0.0888 \\ 0.0052 & -0.0144 & 1.0092 \end{bmatrix} \begin{bmatrix} X \\ Y \\ Z \end{bmatrix}$$

According to the first embodiment, color correction can be performed without conspicuousness of color-variation of the object region in the moving image.

(The Second Embodiment)

As to an image processing apparatus 2 of the second embodiment, a second degree of approximation is calculated by using a color distribution of a light source. Based on the first degree of approximation and the second degree of approximation, a color of each frame is corrected so that a color distribution of an object region in each frame clustered to the same group is unified. This feature is different from the first embodiment. The second embodiment is suitable for the case that a size of the person region in each frame is small.

Figure 4:
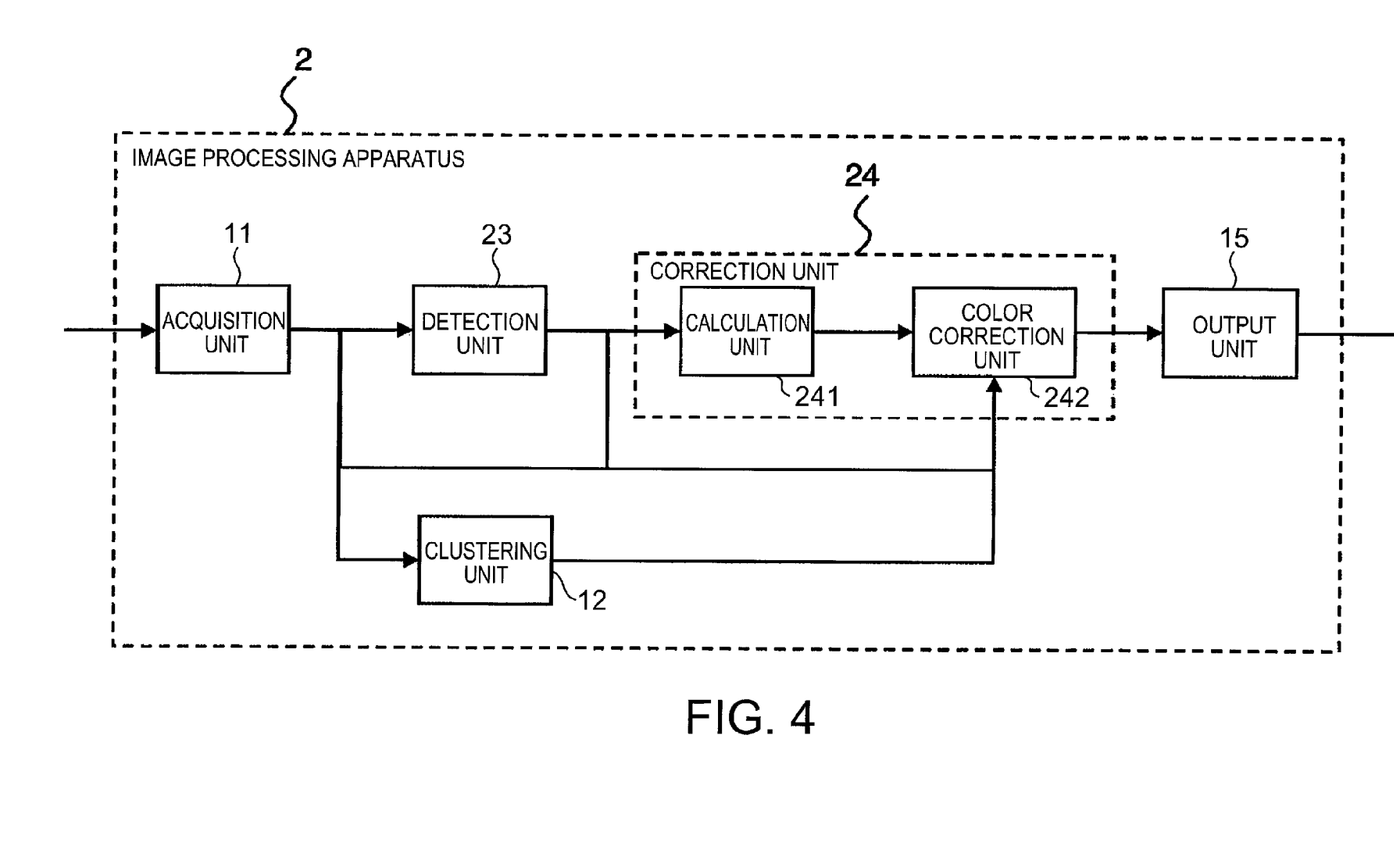
FIG. 4 is a block diagram of an image processing apparatus 2 according to the second embodiment.

FIG. 4 is a block diagram of the image processing apparatus 2 of the second embodiment. Component of the image processing apparatus 2 is same as that of the image processing apparatus 1. However, processing of a detection unit 23 and a correction unit 24 (including a calculation unit 241 and a color correction unit 242) is different from that of the first embodiment. Hereinafter, the feature different from the first embodiment is explained.

From frames clustered to each group, the detection unit 23 detects at least one person's face (person region), and calculates a first color distribution of the person region. Furthermore, the detection unit 23 detects a light source region from the frames of each group, and calculates a color distribution (a second color distribution) of the light source of each frame.

As to each frame, the calculation unit 241 calculates the first degree of approximation, and a second degree of approximation between the second color distribution and a standard color distribution (a second standard color distribution) of a light source previously set.

Based on the first degree of approximation and the second degree of approximation, the first color distribution and the second color distribution, and the first standard color distribution and the second standard color distribution, the color correction unit 242 corrects a color of each frame so that a color distribution of the object region of each frame of the same group is unified.

Thus far, component of the image processing apparatus 2 is already explained.

Figure 5:
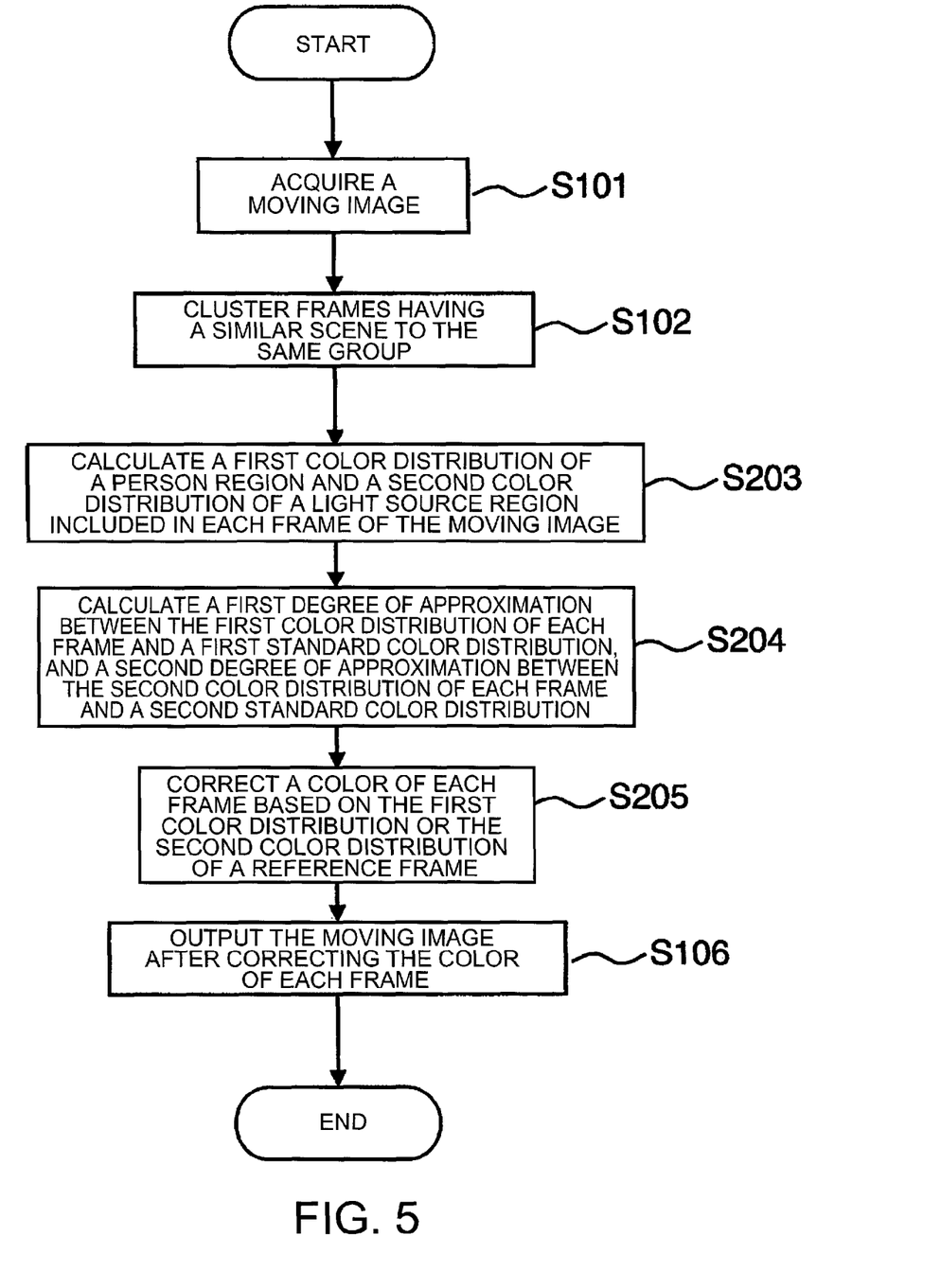
FIG. 5 is a flow chart of the image processing apparatus 2.

FIG. 5 is a flow chart of processing of the image processing apparatus 2. In the flow chart of FIG. 5, in comparison with the flow chart of FIG. 2, steps S103, S104 and S105 are replaced with steps S203, S204 and S205.

At S203, the detection unit 23 detects at least one person's face (person region) from frames clustered to each group, and calculates a first color distribution of the person region in each frame. Furthermore, the detection unit 23 detects a light source region from frames clustered to each group, and calculates a second color distribution of the light source region in each frame (S203). For example, the detection unit 23 may detect a region having high brightness as the light source region, and may calculate the second color distribution thereof.

At S204, the calculation unit 241 calculates a first degree $W_1$ of approximation and a second degree $W_2$ of approximation for each frame (S204).

In the same way as the first embodiment, the calculation unit 241 may store data of the first standard color distribution and data of the second standard color distribution. The data of the second standard color distribution represents a model image of the second standard color distribution or a signal value thereof.

Alternatively, in the same way as the modification of the first embodiment, the calculation unit 241 may calculate the first standard color distribution and the second standard color distribution. Here, the second standard color distribution can be generated by replacing spectral reflectance data $R(\lambda)$ of the person's skin with reflectance data $C(\lambda)$ of a white diffuse reflector.

In this case, by integrating illumination distribution data and the reflectance data $C(\lambda)$ of the white reflector with a color-matching function $f(\lambda)$ or a spectral sensitivity $h(\lambda)$ of camera, the calculation unit 241 generates the second standard color distribution. Furthermore, the calculation unit 241 may store a light source image of a standard light source and a signal value thereof as a data table.

Based on the first degree $W_1$ of approximation and the second degree $W_2$ of approximation, the first color distribution and the second color distribution, and the first standard color distribution and the second standard color distribution, the color correction unit 242 corrects a color of each frame so that a color distribution of the object region of each frame of the same group is unified (S205).

At S205, among frames clustered to the same group, the color correction unit 242 respectively counts the number of frames $F_1$ including the person region and the number of frames $F_2$ including the light source region. As to each frame clustered to the same group, the color correction unit 242 multiplies the first degree $W_1$ of approximation with the number of frames $F_1$ ($W_1 \times F_1$). Furthermore, as to each frame clustered to the same group, the color correction unit 242 multiplies the second degree $W_2$ of approximation with the number of frames $F_2$ ($W_2 \times F_2$). From frames clustered to the same group, the color correction unit 242 selects one frame having the highest value of ($W_1 \times F_1$) or ($W_2 \times F_2$) as a reference frame. As to the reference frame, the color correction unit 242 decides which of ($W_1 \times F_1$) and ($W_2 \times F_2$) is higher.

When ($W_1 \times F_1$) is higher, the color correction unit 242 corrects a color of each frame so that a color distribution of each frame of the same group is unified with the first color distribution of the reference frame. Moreover, as to a frame from which the person region is not detected, a color of this frame is corrected by using an average of correction values of other frames (belonging to the same group as this frame) aligned before and after this frame.

When ($W_2 \times F_2$) is higher, the color correction unit 242 corrects a color of each frame so that a color distribution of each frame of the same group is unified with the second color distribution of the reference frame. Moreover, as to a frame from which the person region is not detected, a color of this frame is corrected by using an average of correction values of other frames (belonging to the same group as this frame) aligned before and after this frame.

According to the second embodiment, even if the person region is not detected from a frame, the reference frame includes the same or similar light source region as this frame. Accordingly, based on the reference frame having the most natural color reappeared, a color of this frame can be corrected by suppressing variation of the color correction.

(The Third Embodiment)

In an image processing apparatus 3 of the third embodiment, a first color correction result of frames (clustered to the same group) is estimated by using the first color distribution, and a second color correction result of the frames is estimated by using the second color distribution. The first color correction result and the second color correction result are unified, and a color of each of the frames is corrected by using the unification result. This feature is different from the second embodiments.

Figure 6:
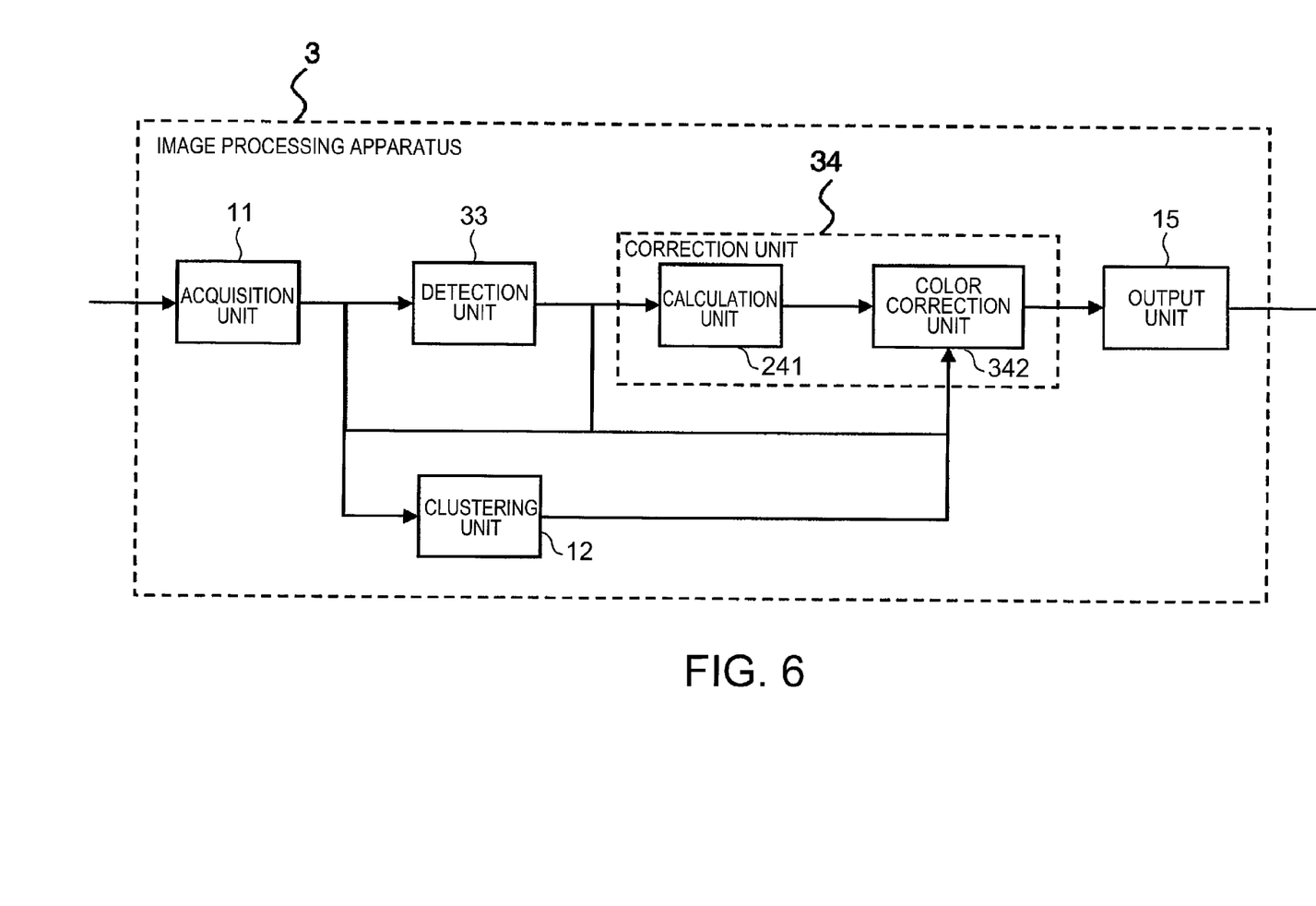
FIG. 6 is a block diagram of processing of an image processing apparatus 3 according to the third embodiment.

FIG. 6 is a block diagram of the image processing apparatus 3 of the third embodiment. Component of the image processing apparatus 3 is same as that of the image processing apparatus 2. However, processing of a detection unit 33 and a color correction unit 342 is different from that of the second embodiment. Hereinafter, the feature different from the second embodiment is explained.

From frames clustered to each group, the detection unit 33 detects a person region, and calculates a first color distribution of the person region. The detection unit 33 detects a position of the person region from each frame. Furthermore, the detection unit 33 detects a light source region from the frames clustered to each group, and calculates a second color distribution of the light source of each frame. The detection unit 33 detects a position of the light source region from each frame.

As to frames clustered to each group, the color correction unit 342 estimates a color correction result (a first color correction result) of each frame based on the first color distribution of a frame having the highest first degree of approximation. Furthermore, the color correction unit 342 estimates a color correction result (a second color correction result) of each frame based on the second color distribution of a frame having the highest second degree of approximation.

Based on the first degree of approximation and the second degree of approximation, the position $P_1$ of the person region, and the position $P_2$ of the light source region, the color correction unit 342 calculates a weighted average of the first color correction result and the second color correction result, and corrects a color of each frame based on the weighted average.

Thus far, component of the image processing apparatus 3 is already explained.

Figure 7:
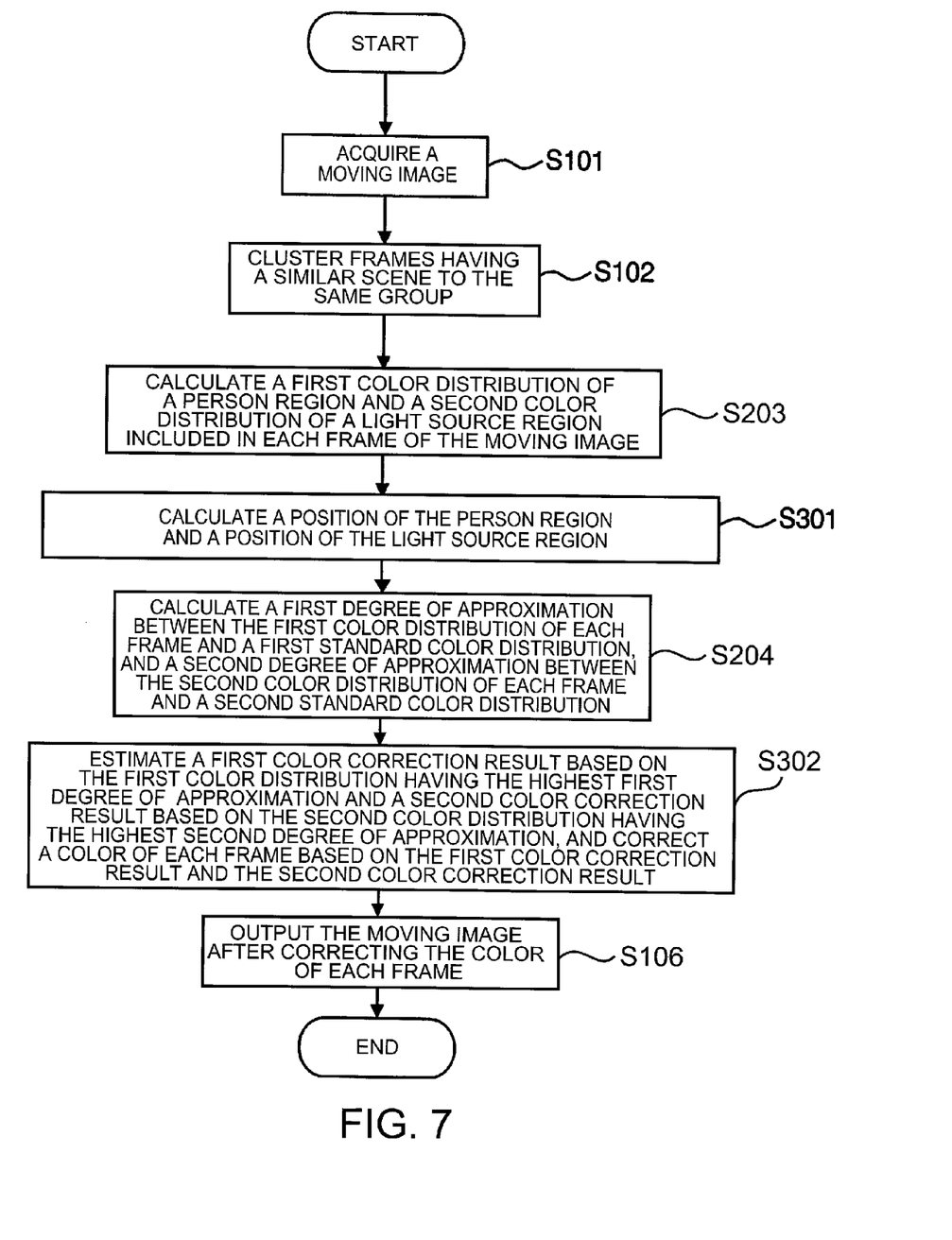
FIG. 7 is a flow chart of processing of the image processing apparatus 3.

FIG. 7 is a flow chart of processing of the image processing apparatus 3. In the flow chart of FIG. 7, in comparison with the flow chart of FIG. 5, step S205 are replaced with step S302. Furthermore, step S301 is added.

At S301, the detection unit 33 detects a position of the person region and a position of the light source region respectively.

At S302, as to each group clustered, the color correction unit 342 estimates the first color correction result and the second color correction result.

Figure 8:
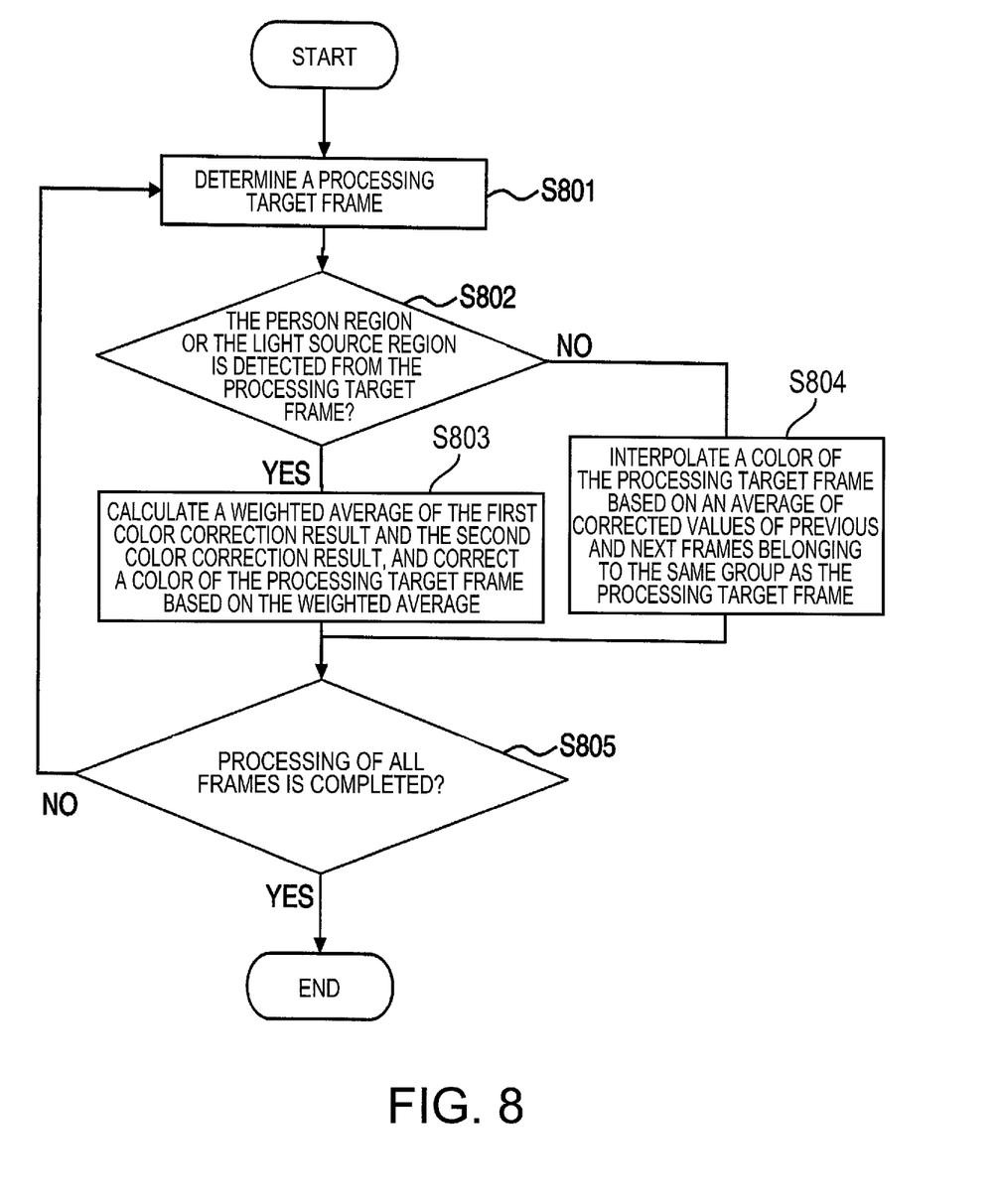
FIG. 8 is a flow chart of processing of a color correction unit 342 in FIG. 6.

FIG. 8 is a flow chart of processing of the color correction unit 342.

The color correction unit 342 determines a frame to be processed (a processing target frame) (S801). The color correction unit 342 decides whether the person region or the light source region is detected from the processing target frame (S802). For example, the color correction unit 342 may decide whether the person region or the light source region is detected based on the first degree of approximation and the second degree of approximation.

If decision of step S802 is YES, the color correction unit 342 blends the first color correction result and the second color correction result with α, and calculates a weighted average thereof (S803).

Figure 9:
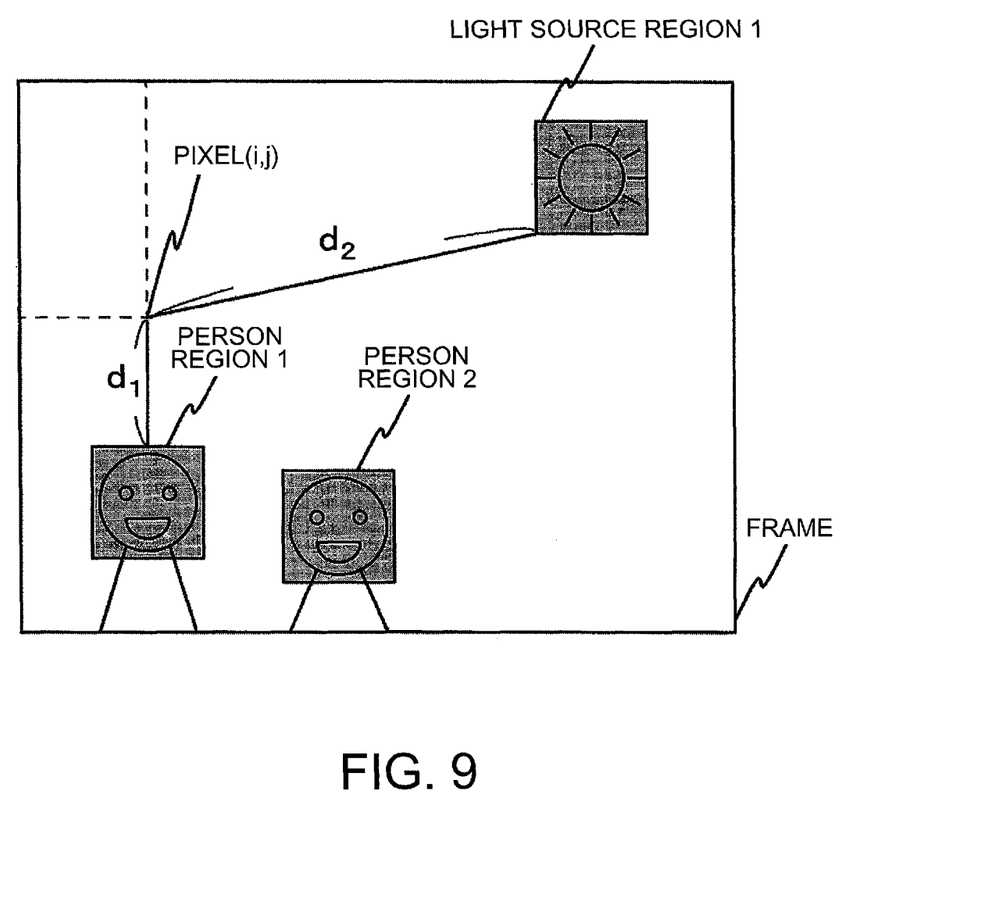
FIG. 9 is a schematic diagram of relationship among a pixel coordinate (i,j), a person region and a light source region in a processing target frame.

FIG. 9 is a schematic diagram of relationship among a pixel coordinate (i,j), the person region and the light source region in the processing target frame. The color correction unit 342 calculates an weighted average (α blend value) of a pixel value A(i,j) of a pixel (i,j) (of each frame) of the first color correction result and a pixel value B(i,j) of a pixel (i,j) (of each frame) of the second color correction result. For example, the color correction unit 342 may calculate a blend value C (i,j) by using an equation (4).

$$C(i, j) = A(i, j) \times \alpha + B(i, j) \times (1 - \alpha) \quad (4)$$

-continued
$$\alpha = \frac{1}{2} \times \left( \frac{W_1}{W_1 + W_2} + f(d, i, j) \right)$$

$$f(d, i, j) = \begin{cases} \text{if skin is'nt detected} & 0 \\ \text{if illuminant is'nt detected} & 1 \\ \text{else} & \frac{d_2(i, j)}{d_1(i, j) + d_2(i, j)} \end{cases}$$

In the equation (4), $W_1$ is the first degree of approximation, $W_2$ is the second degree of approximation, $d_1(i,j)$ is a distance between the pixel (i,j) and the person region, and $d_2(i, j)$ is a distance between the pixel (i,j) and the light source region.

Moreover, if a plurality of regions is detected as the person region or the light source region, the color correction unit 342 may select one region having the shortest distance between the (first or second) color distribution thereof and the (first or second) standard color distribution. Furthermore, if the pixel (i,j) is included in the person region or the light source region, a distance between the pixel (i,j) and the (person or light source) region may be "0". Furthermore, α is a value larger than "0" and smaller than "1.0". In the third embodiment, α is calculated for each pixel (i,j). However, α may be determined for each frame or the moving image acquired.

If decision of step S802 is No, the color correction unit 342 corrects (interpolation calculation) a color of the processing target frame by using an average of correction values of other frames (belonging to the same group as the processing target frame) aligned before and after the processing target frame (S804).

The color correction unit 342 decides whether processing of all frames is already completed (S805). If decision of S805 is NO, processing is transited to S801. If decision of S805 is YES, processing is completed.

According to the image processing apparatus of the third embodiment, in frames (of the moving image) including the same or similar light source region, if a light from another light source is locally illuminated onto the person's skin, color correction can be performed by suppressing variation of the color correction.

As mentioned-above, according to the first, second and third embodiments, color correction can be performed without conspicuousness of color-variation of the object region in the moving image.

As to the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for processing a moving image, the apparatus comprising processing circuitry and memory storing a program which, when executed by the processing circuitry, controls the apparatus to at least:
    acquire the moving image including a plurality of frames;
    cluster frames having a similar scene to a same group in the moving image;
    detect at least one object region from each frame clustered to the same group, and calculate a color distribution of the object region of each frame; and
    select a typical color distribution of the object region from the color distribution of each frame, and correct a color of each frame clustered to the same group, based on the typical color distribution,
    wherein the program, when executed, further controls the apparatus to at least:
    calculate a degree of approximation between the color distribution of each frame and a previously stored standard color distribution of the object region; and
    correct the color of each frame so that the color distribution of the object region of each frame is unified with a color distribution of the object region of a frame having the highest degree of approximation within the same group.

2. The apparatus according to claim 1, wherein the program, when executed, further controls the apparatus to at least calculate the degree of approximation as a distance between the color distribution and the standard color distribution on a chromaticity coordinate.

3. The apparatus according to claim 1, wherein
    the object region includes at least a person region, and
    the color distribution of the object region is a color distribution of a skin of the person region.

4. The apparatus according to claim 3, wherein
    the object region further includes a light source region, and
    the color distribution of the object region is a color distribution of the light source region.

5. The apparatus according to claim 4, wherein the program, when executed, further controls the apparatus to at least
    calculate a first degree of approximation between a first color distribution of the person region and a previously stored first standard color distribution of the person region, calculate a second degree of approximation between a second color distribution of the light source region and a previously stored second standard color distribution of the light source region, and correct the color of each frame so that the color distribution of the object region of each frame is unified based on the first degree of approximation and the second degree of approximation.

6. The apparatus according to claim 5, wherein the program, when executed, further controls the apparatus to at least
    detect a first position of the person region and a second position of the light source region from each frame, and
    estimate a first color correction result of each frame based on the first color distribution of the person region of a frame having the highest first degree of approximation, and estimate a second color correction result of each frame based on the second color distribution of the light source region of a frame having the highest second degree of approximation.

7. The apparatus according to claim 6, wherein the program, when executed, further controls the apparatus to at least
    calculate a weighted average of the first color correction result and the second color correction result based on the first degree of approximation, the second degree of approximation, the first position and the second position, and correct the color of each frame based on the weighted average.

8. The apparatus according to claim 1, wherein the program, when executed, further controls the apparatus to at least
    cluster the plurality of frames based on a distribution of pixel values of a local region in each of the plurality of frames.

9. A method for an apparatus for processing a moving image, the method comprising:
    acquiring the moving image including a plurality of frames;
    clustering frames having a similar scene to a same group in the moving image;
    detecting at least one object region from each frame clustered to the same group;
    calculating a color distribution of the object region of each frame;
    selecting a typical color distribution of the object region from the color distribution of each frame; and
    correcting a color of each frame clustered to the same group, based on the typical color distribution,
    wherein the correcting further comprises:
    calculating a degree of approximation between the color distribution of each frame and a previously stored standard color distribution of the object region; and
    correcting the color of each frame so that the color distribution of the object region of each frame is unified with a color distribution of the object region of a frame having the highest degree of approximation within the same group.

10. The method according to claim 9, wherein
    the calculating further comprises
    calculating the degree of approximation as a distance between the color distribution and the standard color distribution on a chromaticity coordinate.

11. The method according to claim 9, wherein
    the object region includes at least a person region, and
    the color distribution of the object region is a color distribution of a skin of the person region.

12. The method according to claim 11, wherein
    the object region further includes a light source region, and
    the color distribution of the object region is a color distribution of the light source region.

13. The method according to claim 12, wherein
the correcting further comprises:
calculating a first degree of approximation between a first color distribution of the person region and a previously stored first standard color distribution of the person region;
calculating a second degree of approximation between a second color distribution of the light source region and a previously stored second standard color distribution of the light source region; and
correcting the color of each frame so that the color distribution of the object region of each frame is unified based on the first degree of approximation and the second degree of approximation.

14. The method according to claim 13, wherein
the detecting further comprises:
detecting a first position of the person region and a second position of the light source region from each frame;
the correcting further comprises:
estimating a first color correction result of each frame based on the first color distribution of the person region of a frame having the highest first degree of approximation; and
estimating a second color correction result of each frame based on the second color distribution of the light source region of a frame having the highest second degree of approximation.

15. The method according to claim 14, wherein
the correcting further comprises:
calculating a weighted average of the first color correction result and the second color correction result based on the first degree of approximation, the second degree of approximation, the first position and the second position; and
correcting the color of each frame based on the weighted average.

16. A non-transitory computer readable medium containing a program which, when executed, causes a computer to process a moving image by at least:
acquiring the moving image including a plurality of frames;
clustering frames having a similar scene to a same group in the moving image;
detecting at least one object region from each frame clustered to the same group;
calculating a color distribution of the object region of each frame;
selecting a typical color distribution of the object region from the color distribution of each frame; and
correcting a color of each frame clustered to the same group, based on the typical color distribution,
wherein the correcting further comprises:
calculating a degree of approximation between the color distribution of each frame and a previously stored standard color distribution of the object region; and
correcting the color of each frame so that the color distribution of the object region of each frame is unified with a color distribution of the object region of a frame having the highest degree of approximation within the same group.

* * * * *